(12) United States Patent
Yoshida

(10) Patent No.: US 10,232,457 B2
(45) Date of Patent: Mar. 19, 2019

(54) ARC WELDING ROBOT SYSTEM

(71) Applicant: FANUC CORPORATION, Yamanashi (JP)

(72) Inventor: Shigeo Yoshida, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/822,264

(22) Filed: Nov. 27, 2017

(65) Prior Publication Data

US 2018/0154473 A1    Jun. 7, 2018

(30) Foreign Application Priority Data

Dec. 2, 2016  (JP) .................................. 2016-235021

(51) Int. Cl.
*B23K 9/127*  (2006.01)
(52) U.S. Cl.
CPC .................. *B23K 9/1276* (2013.01)
(58) Field of Classification Search
CPC .................................................... B23K 9/1276
USPC ..................................................... 219/124.34
See application file for complete search history.

(56) References Cited

U.S. PATENT DOCUMENTS

| | | | | | |
|---|---|---|---|---|---|
| 3,532,807 A | * | 10/1970 | Wall, Jr. | ............... | B23K 9/1274 219/124.34 |
| 4,021,840 A | * | 5/1977 | Ellsworth | ............ | B23K 9/1274 219/124.1 |
| 4,144,992 A | * | 3/1979 | Omae | .................. | B23K 9/0286 219/125.11 |
| 4,491,719 A | * | 1/1985 | Corby, Jr. | ............ | B23K 9/0956 219/124.34 |
| 4,595,820 A | * | 6/1986 | Richardson | .......... | B23K 9/0956 219/130.01 |
| 4,739,404 A | * | 4/1988 | Richardson | .......... | B23K 9/0956 348/719 |
| 4,859,829 A | * | 8/1989 | Dufour | ................ | B23K 9/0956 219/124.34 |

(Continued)

FOREIGN PATENT DOCUMENTS

| | | |
|---|---|---|
| JP | H02-295675 A | 12/1990 |
| JP | 05-329645 A | 12/1993 |

(Continued)

*Primary Examiner* — Eric S Stapleton
(74) *Attorney, Agent, or Firm* — Studebaker & Brackett PC

(57) ABSTRACT

To provide an arc welding robot system that displays a current waveform graphically during arc welding and realizes parameter adjustment on a display screen. An arc welding robot system comprises a robot controller and a teaching operation terminal. The robot controller comprises: an arc sensor; and a welding current storage unit that stores the current value of a welding current detected by the arc sensor during implementation of the arc welding. The teaching operation terminal comprises: a control unit; and a display on which data is displayed. The control unit comprises: a welding current display unit that displays the current value and the waveform of the welding current in any weaving cycle on the display; a sampling current area display unit that displays a sampling current area on the display; and a current waveform display shift unit that shifts the waveform of the welding current in a temporal axis direction on the display unit.

8 Claims, 11 Drawing Sheets

(56) References Cited

U.S. PATENT DOCUMENTS

| | | | | |
|---|---|---|---|---|
| 4,922,174 A * | 5/1990 | Pietrzak | B25J 9/1697 | 219/124.34 |
| 4,943,702 A * | 7/1990 | Richardson | B23K 9/0956 | 219/124.34 |
| 5,061,841 A * | 10/1991 | Richardson | B23K 9/0956 | 219/130.01 |
| 5,233,158 A * | 8/1993 | Karakama | B23K 9/0956 | 219/130.33 |
| 5,371,339 A * | 12/1994 | Dillet | B23K 9/1274 | 219/124.34 |
| 5,812,408 A * | 9/1998 | Karakama | B23K 9/0953 | 219/109 |
| 5,834,916 A * | 11/1998 | Shimogama | G05B 19/231 | 318/568.13 |
| 6,002,104 A * | 12/1999 | Hsu | B23K 9/0953 | 219/130.5 |
| 6,004,019 A * | 12/1999 | Suita | B23K 11/252 | 700/2 |
| 6,021,361 A * | 2/2000 | Taninaga | B24B 27/04 | 483/16 |
| 6,046,431 A * | 4/2000 | Beattie | B23K 9/1274 | 219/124.34 |
| 6,248,976 B1 * | 6/2001 | Blankenship | B23K 9/1043 | 219/130.21 |
| 6,291,798 B1 * | 9/2001 | Stava | B23K 9/1006 | 219/130.32 |
| 6,352,354 B1 * | 3/2002 | Boillot | B23K 9/127 | 219/124.34 |
| 6,583,386 B1 * | 6/2003 | Ivkovich | B23K 9/0953 | 219/125.1 |
| 6,700,097 B1 * | 3/2004 | Hsu | B23K 9/09 | 219/130.5 |
| 6,717,108 B2 * | 4/2004 | Hsu | B23K 9/09 | 219/130.51 |
| 6,734,394 B2 * | 5/2004 | Hsu | B23K 9/1062 | 219/130.51 |
| 6,794,608 B2 * | 9/2004 | Flood | B23K 9/1062 | 219/130.21 |
| 6,984,805 B2 * | 1/2006 | Shimogama | B23K 9/0953 | 219/124.34 |
| 7,355,145 B2 * | 4/2008 | Ikeda | B23K 9/0953 | 219/125.1 |
| 7,591,408 B2 * | 9/2009 | Walther | B23K 20/10 | 228/1.1 |
| 7,929,824 B2 * | 4/2011 | Davidovici | G02B 21/18 | 386/223 |
| 8,002,165 B2 * | 8/2011 | Zurbuchen | B29C 65/02 | 228/102 |
| 8,144,193 B2 * | 3/2012 | Melikian | B23K 9/32 | 348/90 |
| 8,208,135 B2 * | 6/2012 | Schwarz | B23K 9/0956 | 250/559.04 |
| 8,436,278 B2 * | 5/2013 | Keller | B23K 9/0213 | 219/137 R |
| 8,450,637 B2 * | 5/2013 | Luce | B05B 7/222 | 175/331 |
| 8,471,182 B2 * | 6/2013 | Stauffer | B23K 9/044 | 219/121.59 |
| 8,575,516 B2 * | 11/2013 | Nishisaka | B23K 9/0956 | 219/130.1 |
| 8,642,923 B2 * | 2/2014 | Hillen | B23K 9/095 | 219/130.1 |
| 8,842,191 B2 * | 9/2014 | Melikian | G06K 9/4671 | 348/190 |
| 8,948,917 B2 * | 2/2015 | Massey | B23K 9/16 | 700/259 |
| 9,056,365 B2 * | 6/2015 | Hoertenhuber | B23K 9/0956 | |
| D765,111 S * | 8/2016 | Cole | B23K 9/095 | D14/486 |
| 9,439,277 B2 * | 9/2016 | Stevens | B05B 7/222 | |
| 9,643,275 B2 * | 5/2017 | Spisic | B23K 9/1006 | |
| 9,851,704 B2 * | 12/2017 | Spisic | B23K 9/1006 | |
| 2003/0071025 A1 * | 4/2003 | Hsu | B23K 9/09 | 219/130.5 |
| 2003/0071026 A1 * | 4/2003 | Hsu | B23K 9/1062 | 219/137 PS |
| 2007/0068910 A1 * | 3/2007 | Ikeda | B23K 9/0953 | 219/130.01 |

FOREIGN PATENT DOCUMENTS

| | | |
|---|---|---|
| JP | H09-253857 A | 9/1997 |
| JP | H11-058007 A | 3/1999 |
| JP | 2015-013313 A | 1/2015 |
| JP | 2017-185513 A | 10/2017 |

* cited by examiner

ARC WELDING ROBOT SYSTEM

This application is based on and claims the benefit of priority from Japanese Patent Application No. 2016-235021, filed on 2 Dec. 2016, the content of which is incorporated herein by reference.

BACKGROUND OF THE INVENTION

Field of the Invention

The present invention relates to an arc welding robot system. The present invention particularly relates to an arc welding robot system for implementation of trace welding using an arc sensor.

Related Art

For trace welding using an arc sensor, a welding torch is caused to weave along a weld line in a base material to be welded. At the same time, an arc welding power supply measures change in an arc current or an arc voltage during the weaving and detects deviation of the welding torch from the weld line to make compensation so as to trace the weld line.

The arc sensor determines a trace compensation value for the trace welding using the waveform of the arc current. Hence, grasping the shape of this waveform and determining a compensation parameter based on the shape of the waveform are important for realizing welding tracing the weld line. In this regard, patent document 1 suggests a technique contributing to adjustment of various compensation parameters by displaying the waveform of the arc current graphically and displaying a welding condition, compensation information, etc. together.

Patent Document 1: Japanese Unexamined Patent Application, Publication No. H05-329645

SUMMARY OF THE INVENTION

According to patent document 1, however, various conditions for trace welding using the arc sensor cannot be adjusted easily merely by displaying the waveform of the arc current and displaying a welding condition, etc. together. In particular, trace welding using the arc sensor has caused delay of a servo path from a path of a weaving command or delay resulting from a welding phenomenon. Hence, making adjustment for synchronization of change in an actual welding current with the path of the weaving command has importantly been required. However, patent document 1 does not disclose adjustment for such synchronization. Several methods for automatic adjustment have been known conventionally. These methods are intended to make adjustment for the synchronization automatically, more specifically, to adjust delay time automatically from transmission of a weaving motion command to a welding robot to return of a feedback about a welding current. However, it is next to impossible to derive an appropriate value from a current waveform to vary largely. In many cases, a person responsible for adjustment has eventually been required to adjust a current waveform empirically.

The present invention is intended to provide an arc welding robot system that displays a current waveform graphically during arc welding and realizes parameter adjustment on a display screen.

(1) An arc welding robot system (arc welding robot system 100 described later, for example) according to the present invention performs automatic arc welding by detecting a welding current flowing while welding proceeds with weaving of a welding torch and making the welding torch trace a weld line in a welding work as a center of the weaving using an arc sensor (arc sensor 130 described later, for example). The arc welding robot system comprises a robot controller (robot controller 110 described later, for example) and a teaching operation terminal (teaching operation terminal 150 described later, for example). The robot controller comprises: the arc sensor; and a welding current storage unit (welding current storage unit 140 described later, for example) that stores the current value of a welding current detected by the arc sensor during implementation of the arc welding. The teaching operation terminal comprises: a display (display 170 described later, for example) on which data is displayed; a welding current display unit (welding current display unit 161 described later, for example) that displays the current value and the waveform of the welding current in any weaving cycle on the display; a sampling current area display unit (sampling current area display unit 162 described later, for example) that displays a sampling current area on the display; and a current waveform display shift unit (current waveform display shift unit 163 described later, for example) that shifts the waveform of the welding current in a temporal axis direction on the display unit.

(2) In the arc welding robot system described in (1), the welding current display unit (welding current display unit 161 described later, for example) may comprise an averaged waveform replacement unit (averaged waveform replacement unit 164 described later, for example) that replaces the waveform of the welding current with a waveform averaged over all weaving cycles.

(3) In the arc welding robot system described in (1) or (2), the welding current display unit (welding current display unit 161 described later, for example) may comprise a filtered waveform replacement unit (filtered waveform replacement unit 165 described later, for example) that replaces the waveform of the welding current with a waveform filtered by any filtering method selected by a user.

(4) In the arc welding robot system described in (3), the teaching operation terminal (teaching operation terminal 150 described later, for example) may further comprise a filtering application unit (filtering application unit 166 described later, for example) that applies the filtering method to arc welding to be performed next.

(5) In the arc welding robot system described in (1) to (4), the teaching operation terminal (teaching operation terminal 150 described later, for example) may further comprise an input information application unit (input information application unit 167 described later, for example) that applies information input to the current waveform display shift unit (current waveform display shift unit 163 described later, for example) to implementation of arc welding.

(6) In the arc welding robot system described in (1) to (5), the teaching operation terminal (teaching operation terminal 150 described later, for example) may further comprise: a calculation unit (calculation unit 168 described later, for example) that calculates information to be input to the current waveform display shift unit (current waveform display shift unit 163 described later, for example) based on the amount of deviation between a moment associated with a center in the sampling current area and a moment associated with a peak in the waveform of the welding current, and the current waveform display shift unit may shift the waveform of the welding current in the temporal axis direction on the display (display 170 described later, for example) based on the information.

(7) In the arc welding robot system described in (1) to (5), the teaching operation terminal (teaching operation terminal 150 described later, for example) may further comprise: a calculation unit (calculation unit 168 described later, for example) that calculates information to be input to the current waveform display shift unit (current waveform display shift unit 163 described later, for example) based on the amount of deviation between a moment associated with a center in the sampling current area and a moment associated with a point of intersection of two regression lines or two regression curves determined by fitting of the waveform, and the current waveform display shift unit may shift the waveform of the welding current in the temporal axis direction on the display (display 170 described later, for example) based on the information.

(8) In the arc welding robot system described in (6) or (7), the deviation amount may include multiple deviation amounts associated with corresponding ones of multiple crests in the waveform, and the calculation unit (calculation unit 168 described later, for example) may acquire the multiple deviation amounts and calculate the information to be input to the current waveform display shift unit (current waveform display shift unit 163 described later, for example) by using an average of the multiple deviation amounts.

According to the present invention, a current waveform can be displayed graphically during arc welding and parameter adjustment can be realized on a display screen.

DETAILED DESCRIPTION OF THE INVENTION

Embodiments of the present invention will be described in detail below by referring to FIGS. 1 to 11. An arc welding robot system according to an embodiment of the present invention will be described first in outline by referring to FIGS. 1 to 3.

Figure 1:
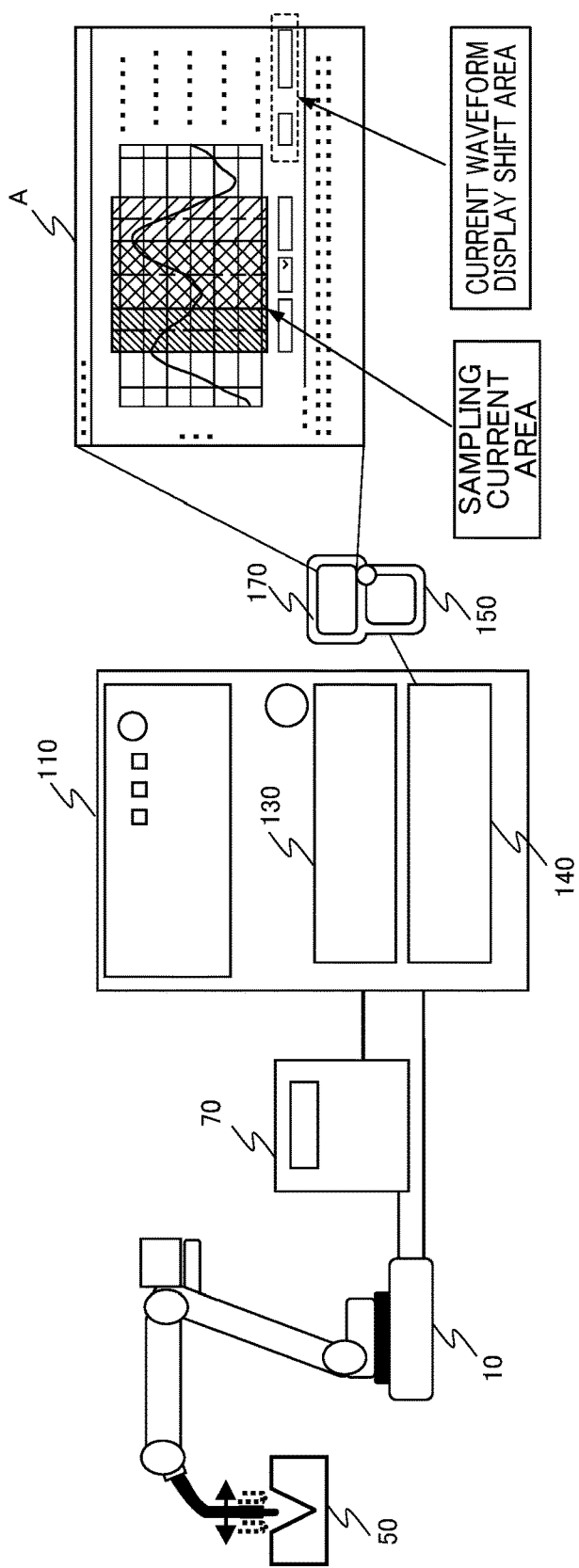
FIG. 1 is an explanatory view about the outline of the present invention.

FIG. 1 shows the outline of the present invention. An arc welding robot system 100 according to the present invention includes: a robot controller 110 that controls an arc welding robot 10; and a teaching operation terminal 150 that displays a welding current waveform by using the current value of a welding current received from the robot controller 110 and shows delay time by shifting the welding current waveform in a temporal axis direction on a display screen.

The arc welding robot 10 performs arc welding on a welding work 50 described later with an arc welding torch mounted at the tip. During arc welding, the arc welding torch makes weaving motion along a weld line to allow an arc sensor 130 described later to acquire a welding current value used for compensating the operation of the arc welding robot 10.

The welding work 50 is welded by the arc welding robot 10. As shown in FIG. 1, the welding work 50 of this example has a V-shaped bevel. Thus, when the arc welding robot 10 welds the welding work 50 while making weaving motion, the value of a welding current during weaving motion changes in response to a distance between the arc welding torch and a surface of the welding work 50. The shape of the bevel is not limited to a V shape. Any shape to generate change in the value of a welding current during weaving motion by the arc welding torch is applicable.

An arc welding power supply 70 feeds the arc welding torch with power for implementation of arc welding. The arc welding power supply 70 of the present invention further functions to measure a welding current during arc welding. The measured current value of the welding current is transmitted to the arc sensor 130 in the robot controller 110.

The robot controller 110 transmits a command for arc welding to the arc welding power supply 70. At the same time, the robot controller 110 controls the operation of the arc welding robot 10 itself and weaving motion by the arc welding torch. The robot controller 110 includes the arc sensor 130 and a welding current storage unit 140 described later provided inside the robot controller 110.

The arc sensor 130 calculates an operation compensation value for making the arc welding torch of the arc welding robot 10 trace a weld line and applies the calculated compensation value to the arc welding robot 10 based on the current value of the welding current measured by the arc welding power supply 70 and the command for weaving motion given by the robot controller 110.

The welding current storage unit 140 stores the current value of the welding current measured by the arc welding power supply 70.

As already described above, the teaching operation terminal 150 displays a welding current waveform on a display 170 with a vertical axis indicating a current value and a horizontal axis as a temporal axis by using the current value of the welding current received from the welding current storage unit 140 of the robot controller 110. Further, the teaching operation terminal 150 shifts the displayed welding current waveform in the temporal axis direction to show delay time.

A symbol A in FIG. 1 indicates an example of a display screen displayed by the display 170 in the teaching operation terminal 150. The display 170 is for display of the current value of the welding current stored in the welding current storage unit 140 and transmitted to the teaching operation terminal 150 and the waveform of the welding current in each weaving cycle. As indicated by the symbol A in FIG.

1, the display screen includes a sampling current area and a current waveform display shift area in addition to the current value and the waveform of the welding current. The sampling current area includes three areas: a "weaving left end area" corresponding to the left end of weaving; a "weaving center area" corresponding to the center of the weaving; and a "weaving right end area" corresponding to the right end of the weaving. More specifically, the "weaving left end area" is an area associated with a length of time corresponding to a predetermined buffer amount and before and after a moment as a center when the arc welding torch stops at the left end of the bevel. Likewise, the "weaving right end area" is an area associated with a length of time corresponding to a predetermined buffer amount and before and after a moment as a center when the arc welding torch stops at the right end of the bevel. The "weaving center area" is an area other than the "weaving left end area" and the "weaving right end area." A center line is displayed as a mark at a center in each area. The current waveform display shift area includes an entry field and a simulation button. The entry field is for input of a delay time adjustment value corresponding to a shift amount for a current waveform. If a user inputs a delay time adjustment value to the entry field and then presses the simulation button, the waveform of a welding current is shifted in the temporal axis direction (horizontal direction) in the sampling current area.

Figure 2:
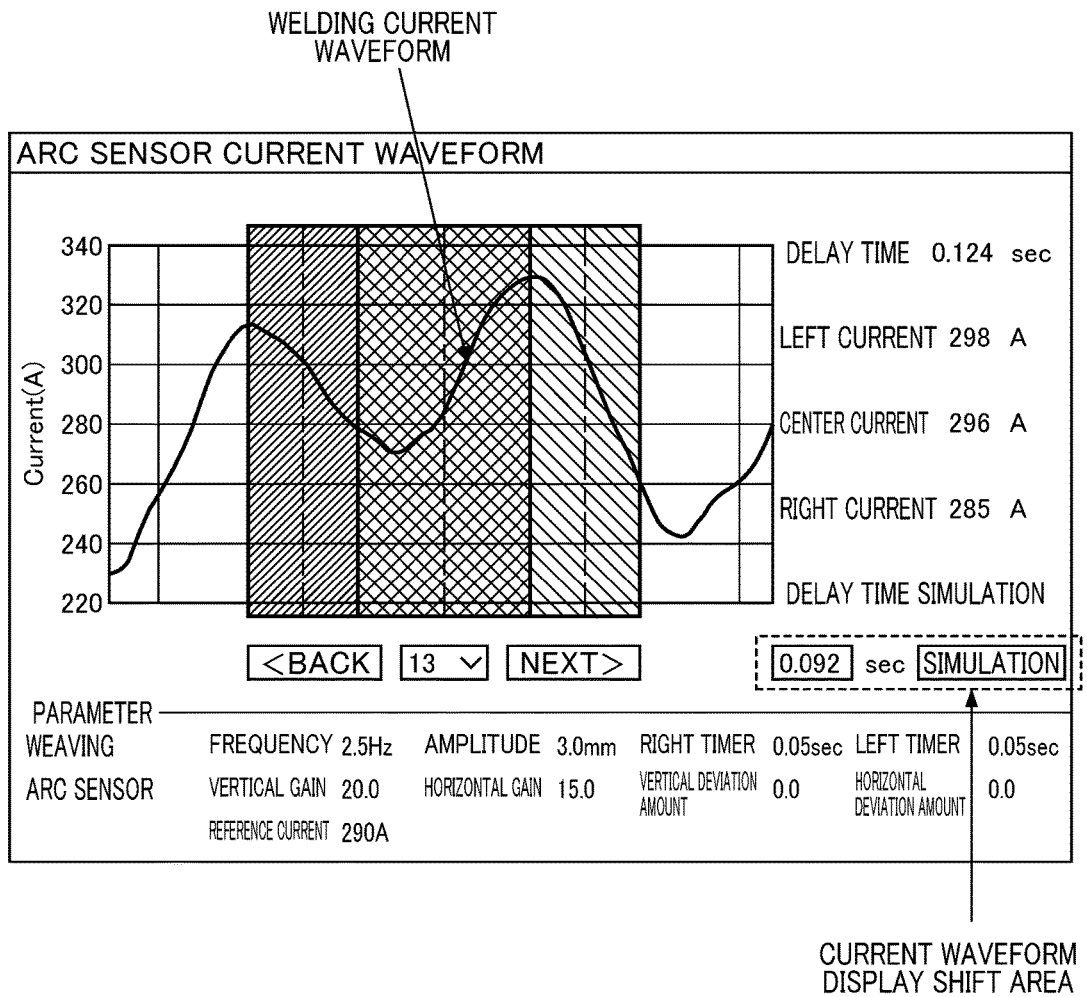
FIG. 2 shows an example of a screen displayed on a display of an arc welding robot system according to an embodiment of the present invention.

The exemplary display screen indicated by the symbol in FIG. 1 is illustrated in more detail in FIG. 2. A graph displayed from the left end toward the center of the display screen shows a welding current waveform in each weaving cycle. The vertical axis of the graph indicates a welding current value and the horizontal axis of the graph is a temporal axis. A weaving cycle to become a target of display of a welding current waveform can be changed by switching of the number of a weaving cycle by a user.

As already described above, this graph includes the three sampling current areas, the "weaving left end area," the "weaving center area," and the "weaving right end area." The "weaving left end area" is an area corresponding to the left end of weaving. The "weaving right end area" is an area corresponding to the right end of the weaving. The "weaving center area" is an area other than the "weaving left end area" and the "weaving right end area."

The display screen includes the respective values of "delay time," "left current," "center current," and "right current" displayed in a right part of the display screen and above the current waveform display shift area. The "delay time" indicates default delay time mainly including delay time resulting from a servo motor for operating a welding robot and delay time caused by application of a filter at a power supply for a welding current. The "left current" is an average determined by sampling current values from multiple points on a part of a welding current waveform existing in the weaving left end area and obtaining an average of these multiple current values. Likewise, the "center current" is an average determined by sampling current values from multiple points on a part of the welding current waveform existing in the weaving center area and obtaining an average of these multiple current values. The "right current" is an average determined by sampling current values from multiple points on a part of the welding current waveform existing in the weaving right end area and obtaining an average of these multiple current values.

The display screen includes various parameters relating to arc welding being performed displayed on a lower part of the display screen. In the illustration of FIG. 2, displayed parameters relating to weaving include the respective values of a frequency, an amplitude, a right timer, and a left timer. Further, displayed parameters relating to an arc sensor include the respective values of a vertical gain, a horizontal gain, a vertical deviation amount, a horizontal deviation amount, and a reference current.

For precise operation compensation during arc welding, it is desirable that a left-side peak in a welding current waveform is positioned at a center in the weaving left end area, and a right-side peak in the welding current waveform be positioned at a center in the weaving right end area. Deviation of a peak in a waveform from a center in each area can be compensated for by input of a delay time adjustment value to the delay time adjustment value entry field and press of the simulation button by a user described above.

Figure 3:
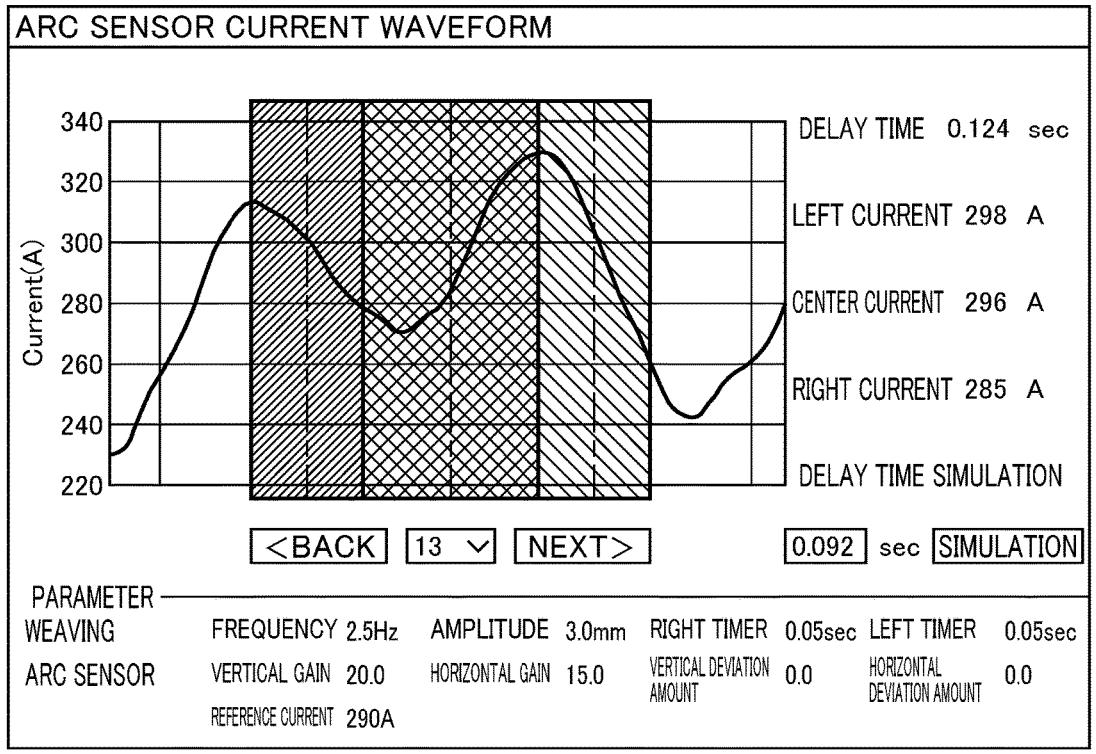
FIG. 3 shows operation of shifting a welding current waveform on the display of the arc welding robot system according to the embodiment of the present invention.
Figure 3:
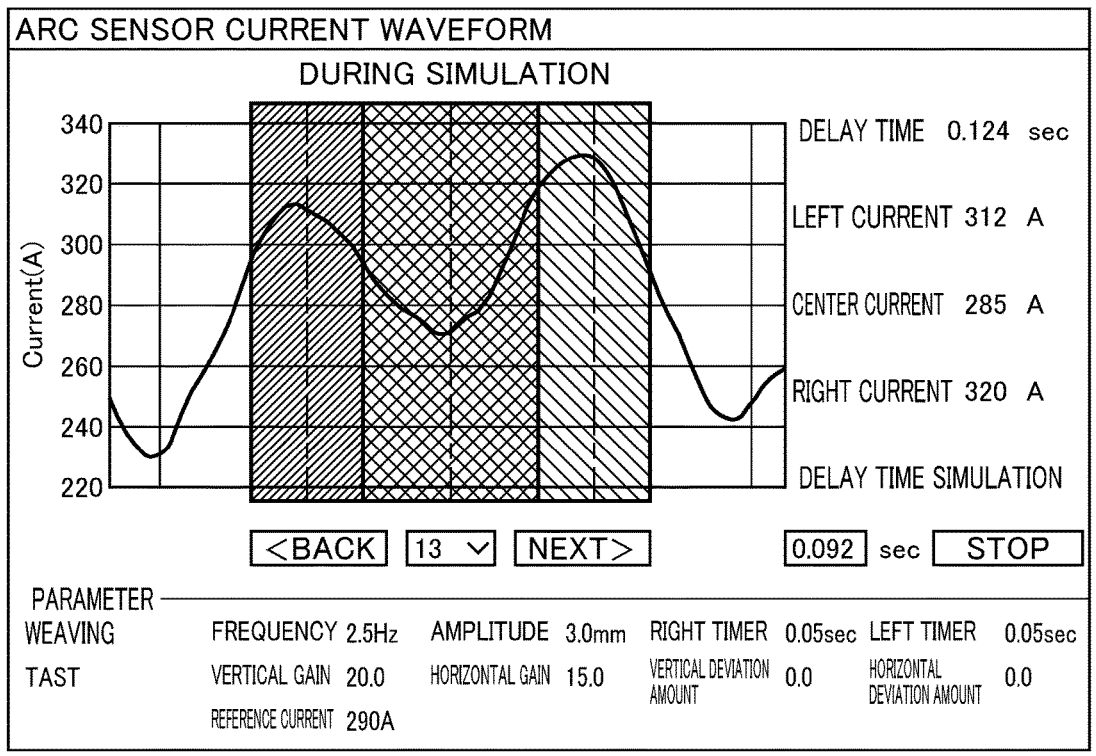

FIG. 3 shows an example of a shift between current waveform displays. In the upper display screen of FIG. 3, a peak of a left crest in a welding current waveform is on the left side of a center in the "weaving left end area." Likewise, a peak of a right crest in the welding current waveform is on the left side of a center in the "weaving right end area." In this case, a user inputs a delay time adjustment value to the delay time adjustment value entry field and presses the simulation button. Then, the displayed welding current waveform is shifted toward the right. As shown in the lower display screen of FIG. 3, appropriate delay time can be obtained with an input delay time adjustment value controlled by a user in such a manner that respective peaks of crests in the shifted welding current waveform substantially agree with corresponding ones of a center in the "weaving left end area" and a center in the "weaving right end area." With the shift in the welding current waveform, the respective values of "left current," "center current," and "right current" displayed in the right part of the display screen are changed.

First Embodiment

Figure 4:
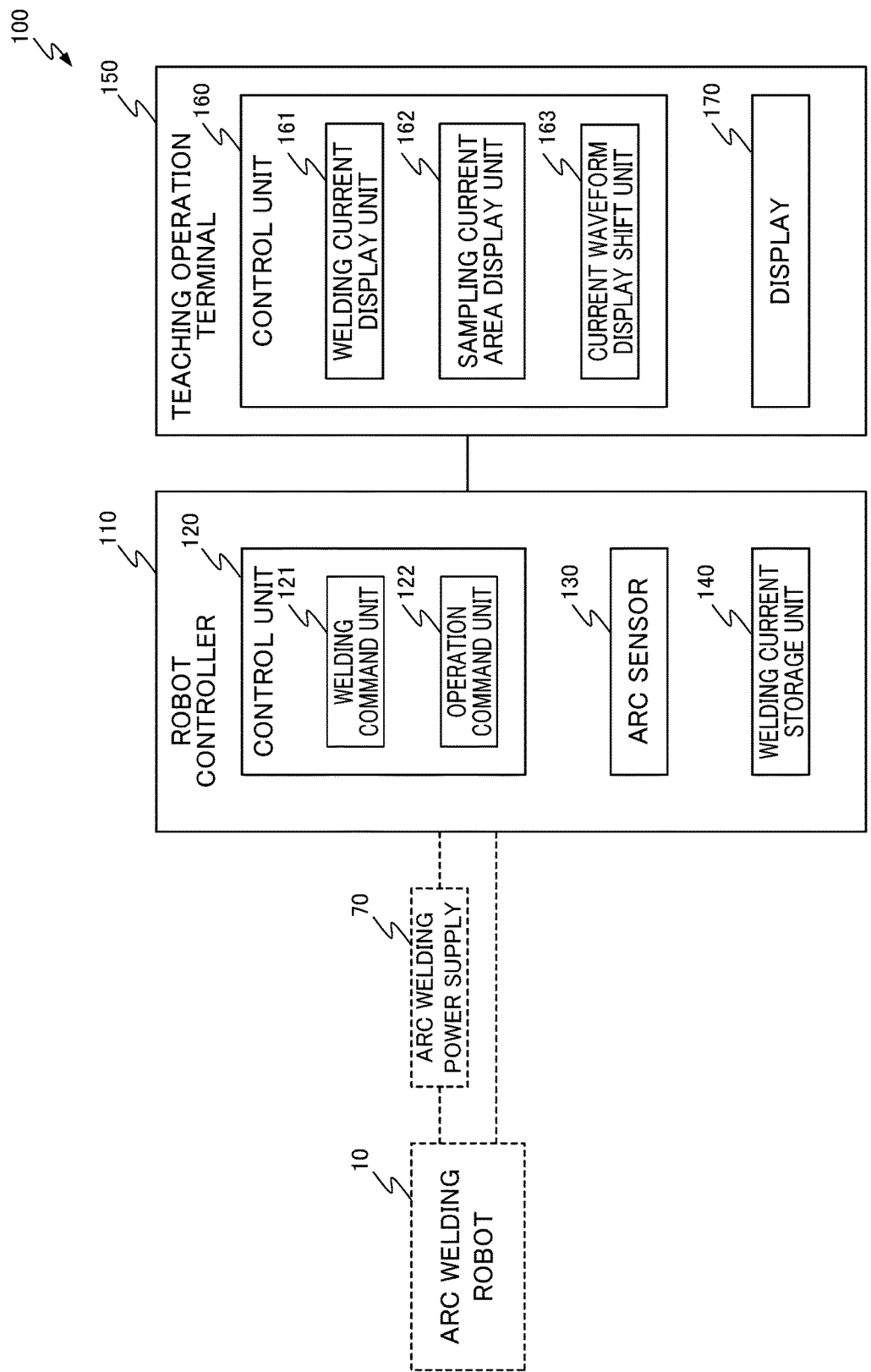
FIG. 4 is a functional block diagram showing the configuration of the arc welding robot system according to the embodiment of the present invention.

FIG. 4 is a functional block diagram showing the configuration of the arc welding robot system 100 according to a first embodiment of the present invention. The respective functions of components will be described below while some of the functions are already described above partially.

The arc welding robot system 100 includes the robot controller 110 and the teaching operation terminal 150.

The robot controller 110 includes a control unit 120, the arc sensor 130, and the welding current storage unit 140.

The control unit 120 controls the robot controller 110 entirely. Part of the control unit 120 includes a welding command unit 121 and an operation command unit 122. For example, the control unit 120 may be a processor that realizes the functions of units including the welding command unit 121 and the operation command unit 122 by following a system program and an application program read by the control unit 120 from a ROM (not shown in the drawings) through a bus. The welding command unit 121 gives a command for arc welding to the arc welding power supply 70. In response to receipt of the command, the arc welding power supply 70 feeds the arc welding torch of the arc welding robot 10 with power for arc welding. The operation command unit 122 gives a command for movement of the arc welding robot 10 itself and for weaving motion by the arc welding torch to the arc welding robot 10.

The arc sensor 130 calculates an operation compensation value for making the arc welding torch of the arc welding robot 10 trace a weld line and applies the calculated compensation value to the arc welding robot 10 based on the current value of a welding current measured by the arc welding power supply 70 and the command for weaving motion given by the operation command unit 122.

The welding current storage unit 140 stores the current value of the welding current measured by the arc welding power supply 70. The stored current value of the welding current is transmitted from a transceiver (not shown in the drawings) in the robot controller 110 to the teaching operation terminal 150 described later.

The teaching operation terminal 150 includes a control unit 160 and a display 170. The control unit 160 controls the teaching operation terminal 150 entirely. Part of the control unit 160 includes a welding current display unit 161, a sampling current area display unit 162, and a current waveform display shift unit 163. For example, the control unit 160 may be a processor that realizes the functions of units including the welding current display unit 161, the sampling current area display unit 162, and the current waveform display shift unit 163 by following a system program and an application program read by the control unit 160 from a ROM (not shown in the drawings) through a bus. The welding current display unit 161 displays the current value of a welding current in each weaving cycle on the display 170 described later received from the welding current storage unit 140 of the robot controller 110 through a transceiver (not shown in the drawings) of the teaching operation terminal 150. The sampling current area display unit 162 displays a sampling current area on the display 170 described later. As already described above, the sampling current area includes three areas: the "weaving left end area" corresponding to the left end of weaving; the "weaving center area" corresponding to the center of the weaving; and the "weaving right end area" corresponding to the right end of the weaving. The sampling current area display unit 162 further displays a center line at a center in each area. If a user inputs a delay time adjustment value to the delay time adjustment value entry field displayed on the display 170 described later and presses the simulation button on the display 170, the current waveform display shift unit 163 shifts a welding current waveform displayed on the display 170 in the temporal axis direction in response to the input delay time adjustment value. The display 170 is for display of various types of data including the above-described current value and the waveform of a welding current.

Figure 5:
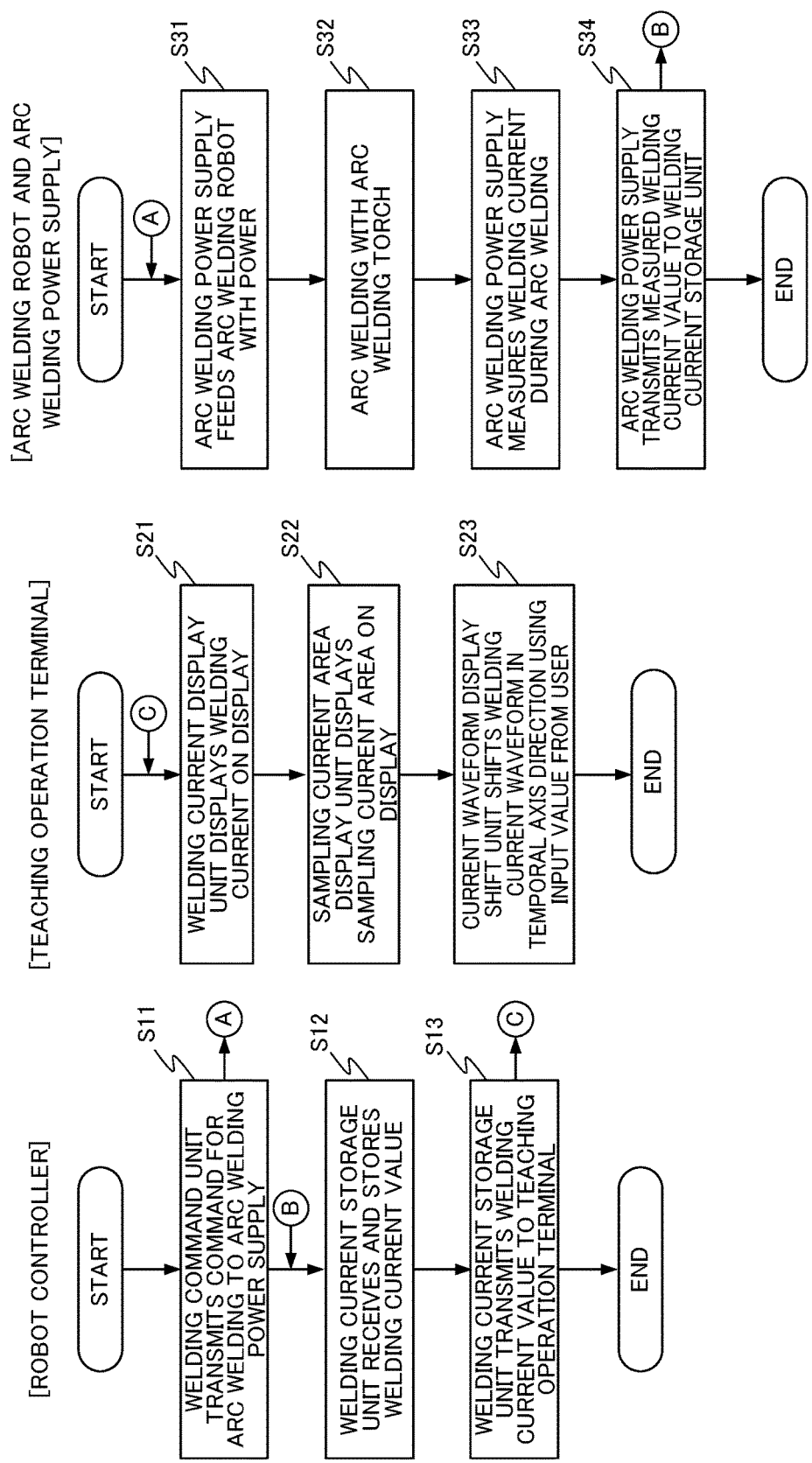
FIG. 5 shows the operation of the arc welding robot system according to the embodiment of the present invention.

The operation of the arc welding robot system 100 will be described in detail next by referring to FIG. 5. For the convenience of description, the respective operations of the arc welding robot 10 and the arc welding power supply 70 will be described in addition to the respective operations of the robot controller 110 and the teaching operation terminal 150 forming the arc welding robot system 100.

The operation of the robot controller 110 will be described first. In step S11, the welding command unit 121 transmits a command for arc welding to the arc welding power supply 70 through the transceiver.

Next, as will be described in detail later, the arc welding power supply 70 feeds the arc welding torch of the arc welding robot 10 with power to perform arc welding in response to receipt of the command for arc welding as a trigger. At this time, the arc welding power supply 70 measures a welding current during arc welding and transmits the measured current value to the welding current storage unit 140 of the robot controller 110.

In step S12, the welding current storage unit 140 receives the measured current value from the arc welding power supply 70 through the transceiver and stores the received current value.

In step S13, the welding current storage unit 140 transmits the stored current value of the welding current to the teaching operation terminal 150 through the transceiver.

The operation of the teaching operation terminal 150 will be described next. In step S21, the welding current display unit 161 displays the current value of the welding current received by the teaching operation terminal 150 through the transceiver from the welding current storage unit 140 of the robot controller 110 and the waveform of the welding current on the display 170.

In step S22, the sampling current area display unit 162 displays a sampling current area including the "weaving left end area," "weaving center area," and the "weaving right end area" on the display 170 together with a center line in each area.

In step S23, based on a delay time adjustment value in the delay time adjustment value entry field input by a user having viewed the position of the welding current waveform and the position of the center line in each area relative to each other displayed on the display 170, the current waveform display shift unit 163 shifts the welding current waveform in the temporal axis direction.

Finally, the respective operations of the arc welding robot 10 and the arc welding power supply 70 will be described. In step S31, the arc welding power supply 70 feeds the arc welding torch of the arc welding robot 10 with power for implementation of arc welding.

In step S32, the arc welding torch of the arc welding robot 10 performs arc welding. More specifically, the arc welding torch performs arc welding while making weaving motion along a weld line.

In step S33, the arc welding power supply 70 measures the welding current during arc welding.

In step S34, the arc welding power supply 70 transmits the measured welding current value to the welding current storage unit 140.

The user inputs a delay time adjustment value to the delay time adjustment value entry field and presses the simulation button, thereby shifting the welding current waveform repeatedly in the temporal axis direction and examining the amount of deviation of a peak in the welding current waveform from the center line in the sampling current area repeatedly. Then, the user acquires a delay time adjustment value at a moment when agreement is reached between the peak in the welding current waveform and the center line in the sampling current area as an appropriate delay time adjustment value.

Effect Achieved by First Embodiment

As described above, this embodiment allows a welding current waveform to be displayed graphically and allows delay time adjustment on the graphic display. More specifically, the entry field for delay time adjustment is provided around a part where the welding current waveform is displayed graphically. If a delay time adjustment value is input to the entry field, the graphically displayed welding current waveform is shifted so as to follow the input value. A delay time adjustment value to be input is controlled so to reach agreement between a peak point in the welding current waveform and a center line in the sampling current area successfully. By doing so, the input delay time adjustment value can be acquired as an appropriate delay time adjustment value. In short, an appropriate delay time adjustment value can be acquired by display of a welding current waveform during arc welding on the display and offset of a peak in the waveform on the display by a user so as to make the peak agree with a center in the sampling current area. In particular, in a conventional arc welding system using an arc sensor, changing delay time and then acquiring a welding current waveform again has required additional arc welding to be performed on a welding work. This has caused additional time and extra cost. In this regard, this embodiment allows shift of a welding current waveform displayed graphically and simulation of the amount of the shift of the welding current waveform. This eliminates the need for additional time and extra cost described above.

Second Embodiment

Figure 6:
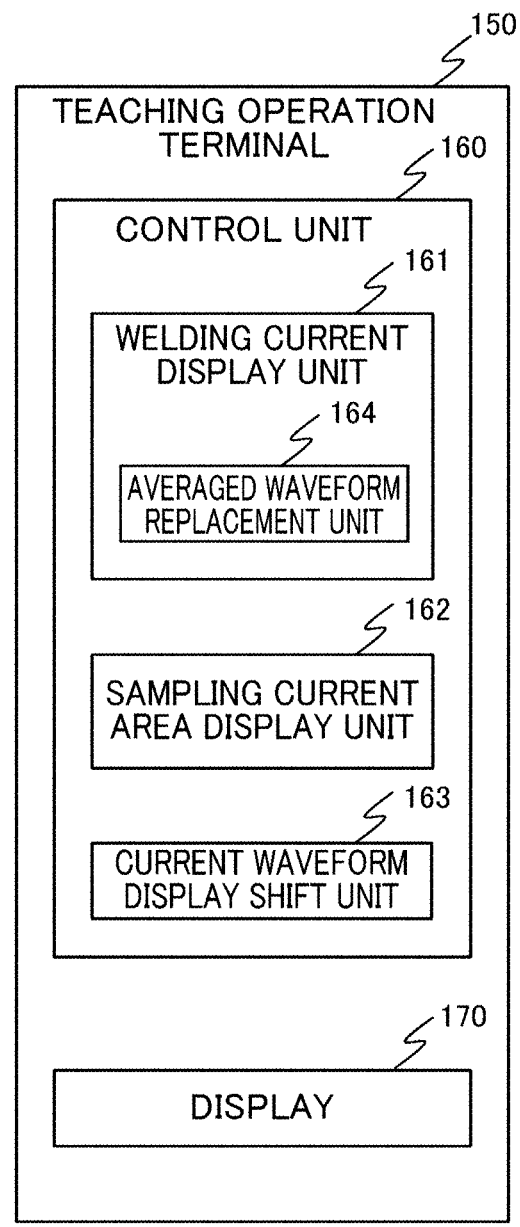
FIG. 6 is a functional block diagram showing the configuration of a teaching operation terminal according to the embodiment of the present invention.

FIG. 6 is a functional block diagram showing the configuration of the teaching operation terminal 150 in an arc welding robot system 200 according to a second embodiment of the present invention. The robot controller 110 in the arc welding robot system 200 is the same as that of the first embodiment so is not shown in the drawings. In FIG. 6, components same as those of the first embodiment are identified by the same signs.

The second embodiment differs from the first embodiment in that the welding current display unit 161 includes an averaged waveform replacement unit 164.

In the first embodiment, the welding current display unit 161 displays a welding current waveform in each weaving cycle on the display 170 as described above. In the second embodiment, the averaged waveform replacement unit 164 in the welding current display unit 161 replaces a welding current waveform with a waveform averaged over all weaving cycles.

Effect Achieved by Second Embodiment

A welding current waveform varies between weaving cycles. Hence, optimum delay time acquired in one cycle is not always appropriate delay time for a different cycle. In this regard, in the second embodiment, the averaged waveform replacement unit 164 replaces a welding current waveform to be displayed on the display 170 with a waveform averaged over all weaving cycles. Then, the current waveform display shift unit 163 shifts the welding current waveform and adjusts delay time. This allows adjustment of delay time with low probability of an error factor realized by reduced variation between weaving cycles, leading to acquisition of delay time used effectively in all weaving cycles.

Third Embodiment

Figure 7:
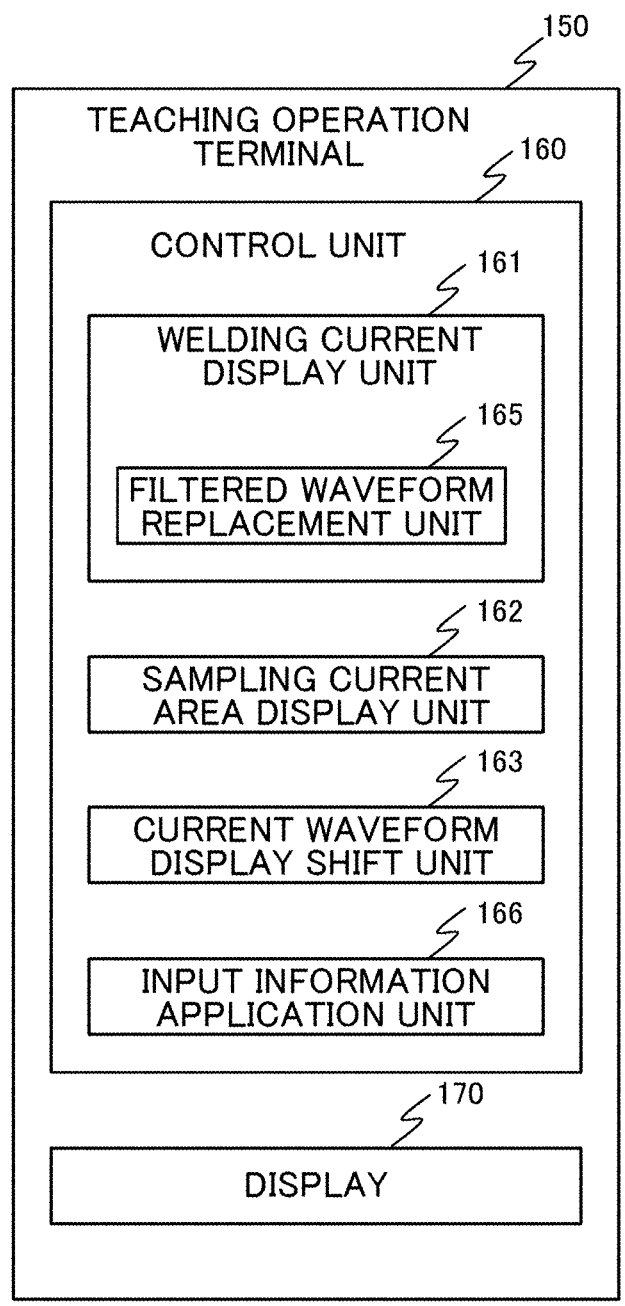
FIG. 7 is a functional block diagram showing the configuration of the teaching operation terminal according to the embodiment of the present invention.

FIG. 7 is a functional block diagram showing the configuration of the teaching operation terminal 150 in an arc welding robot system 300 according to a third embodiment of the present invention. The robot controller 110 in the arc welding robot system 300 is the same as that of the first embodiment so is not shown in the drawings. In FIG. 7, components same as those of the first embodiment are identified by the same signs.

The third embodiment differs from the first embodiment in that the welding current display unit 161 includes a filtered waveform replacement unit 165 and the control unit 160 includes a filtering application unit 166.

In the first embodiment, a welding current waveform to be displayed on the display 170 by the welding current display unit 161 is not subjected to any particular processing. In the third embodiment, the filtered waveform replacement unit 165 removes a noise component from a welding current waveform. The welding current display unit 161 displays the welding current waveform without a noise component on the display 170. Any method of the filtering can be selected by a user. For example, a low-pass filter is applicable. Performing filtering processing on a welding current waveform causes delay time resulting from the filtering. Hence, the delay time resulting from the filtering is considered in shifting the welding current waveform and adjusting delay time.

In the third embodiment, the filtering application unit 166 applies the above-described filtering method to arc welding to be performed next. More specifically, if a user selects a particular filtering method from multiple filtering methods, applies the selected filtering method, and the selected filtering method is determined to be useful, the filtering application unit 166 applies the selected filtering method to arc welding to be performed next.

Effect Achieved by Third Embodiment

In the third embodiment, a welding current waveform is filtered and a resultant waveform without a noise component is displayed on the display, thereby facilitating compensation for delay time. Further, examination can be conducted to determine a best filtering method to be implemented on a welding current waveform. Still further, a filtering method determined to be effective as a result of the examination is actually applied to arc welding, so that arc welding can be performed more precisely.

Fourth Embodiment

Figure 8:
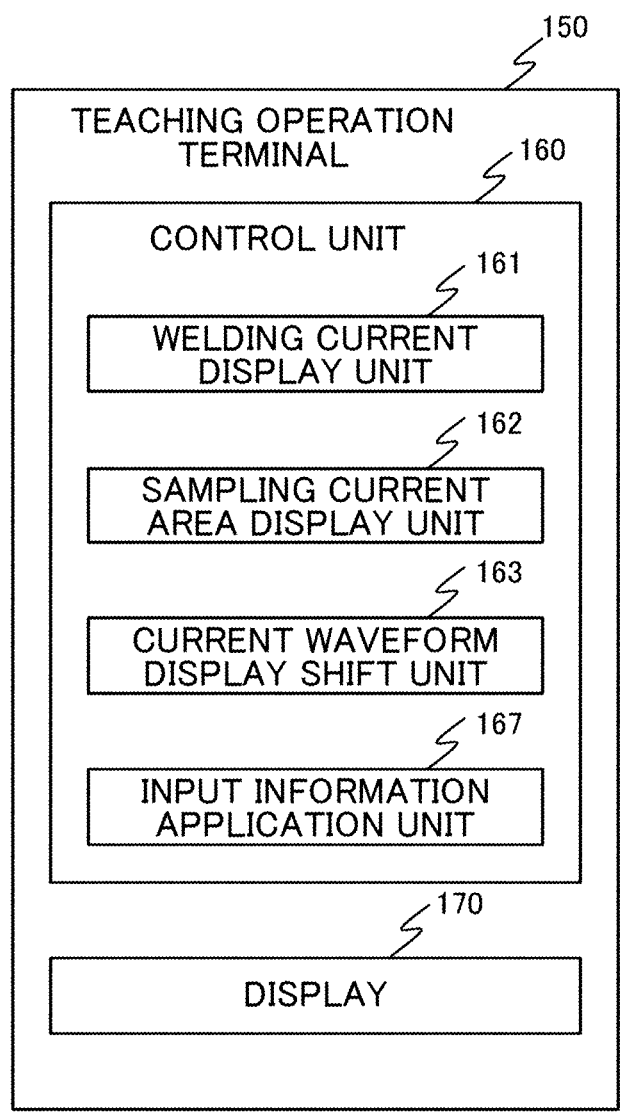
FIG. 8 is a functional block diagram showing the configuration of the teaching operation terminal according to the embodiment of the present invention.

FIG. 8 is a functional block diagram showing the configuration of the teaching operation terminal 150 in an arc welding robot system 400 according to a fourth embodiment of the present invention. The robot controller 110 in the arc welding robot system 400 is the same as that of the first embodiment so is not shown in the drawings. In FIG. 8, components same as those of the first embodiment are identified by the same signs.

The fourth embodiment differs from the first embodiment in that the control unit 160 includes an input information application unit 167.

In the first embodiment, a user inputs a delay time adjustment value to the delay time adjustment value entry field, shifts a welding current waveform, and then refers to deviation of a peak in the welding current waveform from a center line in each area forming the sampling current area, thereby acquiring an appropriate delay time adjustment value. This acquisition of the appropriate delay time adjustment value by the user means completion of use of the arc welding robot system 100 by the user.

In the fourth embodiment, the input information application unit 167 applies a delay time adjustment value examined by the user in the same way as that in the first embodiment to implementation of actual arc welding.

Figure 9:
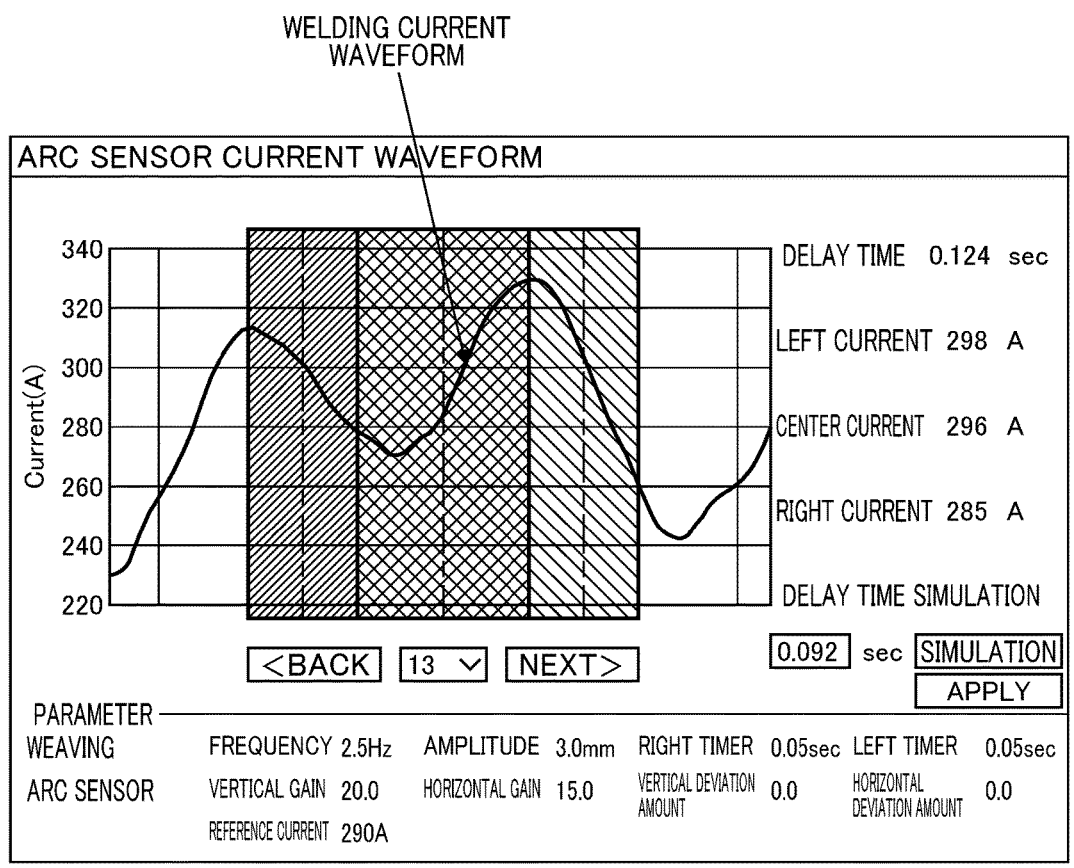
FIG. 9 shows an example of a screen displayed on the display of the arc welding robot system according to the embodiment of the present invention.

More specifically, unlike the display screen of the first embodiment, a display screen shown in FIG. 9 includes an application (APPLY) button displayed in the current waveform display shift area in addition to the delay time adjustment value entry field and the simulation button. A user inputs a delay time adjustment value to the delay time adjustment value entry field and presses the simulation button, thereby shifting a welding current waveform repeatedly in the temporal axis direction and examining the amount of deviation of a peak in the welding current waveform from a center line in the sampling current area repeatedly. Then, at a moment when agreement is reached between the peak in the welding current waveform and the center line in the sampling current area, the user presses the application (APPLY) button. In response to the press of this button as a trigger, the input information application unit 167 applies the delay time adjustment value showing a result of the examination to implementation of actual arc welding.

Effect Achieved by Fourth Embodiment

In the fourth embodiment, after an appropriate delay time adjustment value is acquired, the input information application unit allows the acquired delay time adjustment value to be applied immediately to arc welding. This eliminates a burden on the robot controller 110 of moving to a separate setting screen for making setting for arc welding, in particular, for inputting an adjustment value.

Fifth Embodiment

Figure 10:
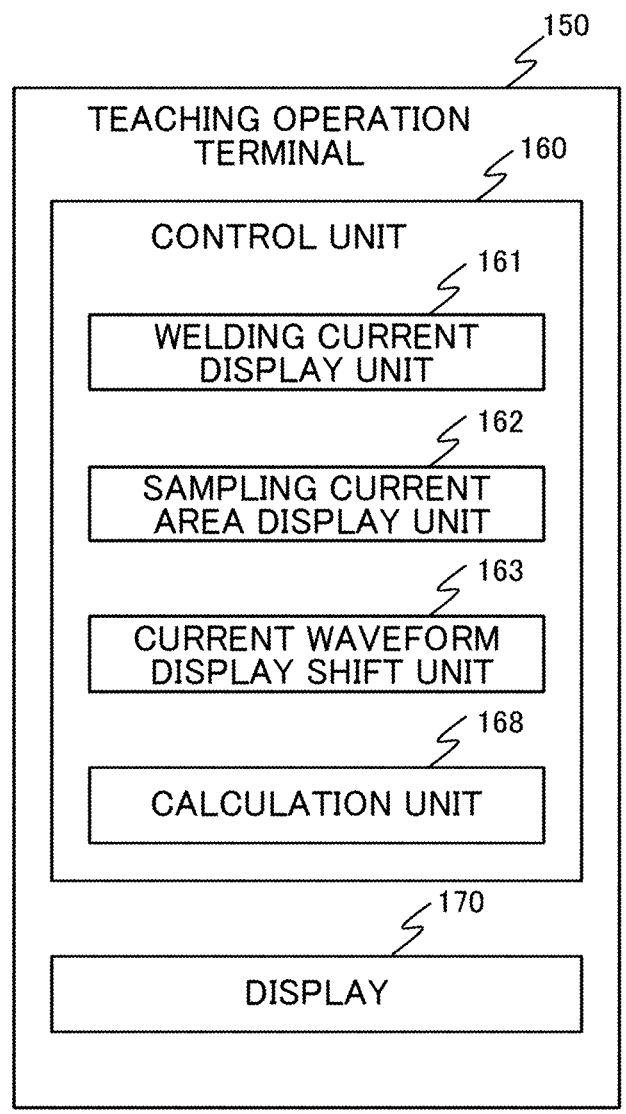
FIG. 10 is a functional block diagram showing the configuration of the teaching operation terminal according to the embodiment of the present invention.

FIG. 10 is a functional block diagram showing the configuration of the teaching operation terminal 150 in an arc welding robot system 500 according to a fifth embodiment of the present invention. The robot controller 110 in the arc welding robot system 500 is the same as that of the first embodiment so is not shown in the drawings. In FIG. 10, components same as those of the first embodiment are identified by the same signs.

The fifth embodiment differs from the first embodiment in that the control unit 160 includes a calculation unit 168.

In the first embodiment, a user inputs a delay time adjustment value to the delay time adjustment value entry field, shifts a welding current waveform, and then refers to deviation of a peak in the welding current waveform from a center line in each area forming the sampling current area, thereby acquiring a delay time adjustment value. Specifically, the user inputs the delay time adjustment value to manually the delay time adjustment value entry field. Then, the user shifts the welding current waveform repeatedly and examines the amount of deviation of the peak in the welding current waveform from the center line in the sampling current area repeatedly. In this way, the user acquires a delay time adjustment value.

In the fifth embodiment, the calculation unit 168 in the control unit 160 calculates a delay time adjustment value automatically.

The calculation unit 168 can calculate a delay time adjustment value automatically by determining a peak position of a crest in a welding current waveform through calculation of a maximum value and acquiring the amount of deviation of a moment associated with this peak position from a moment associated with a center line in each area forming the sampling current area.

Figure 11:
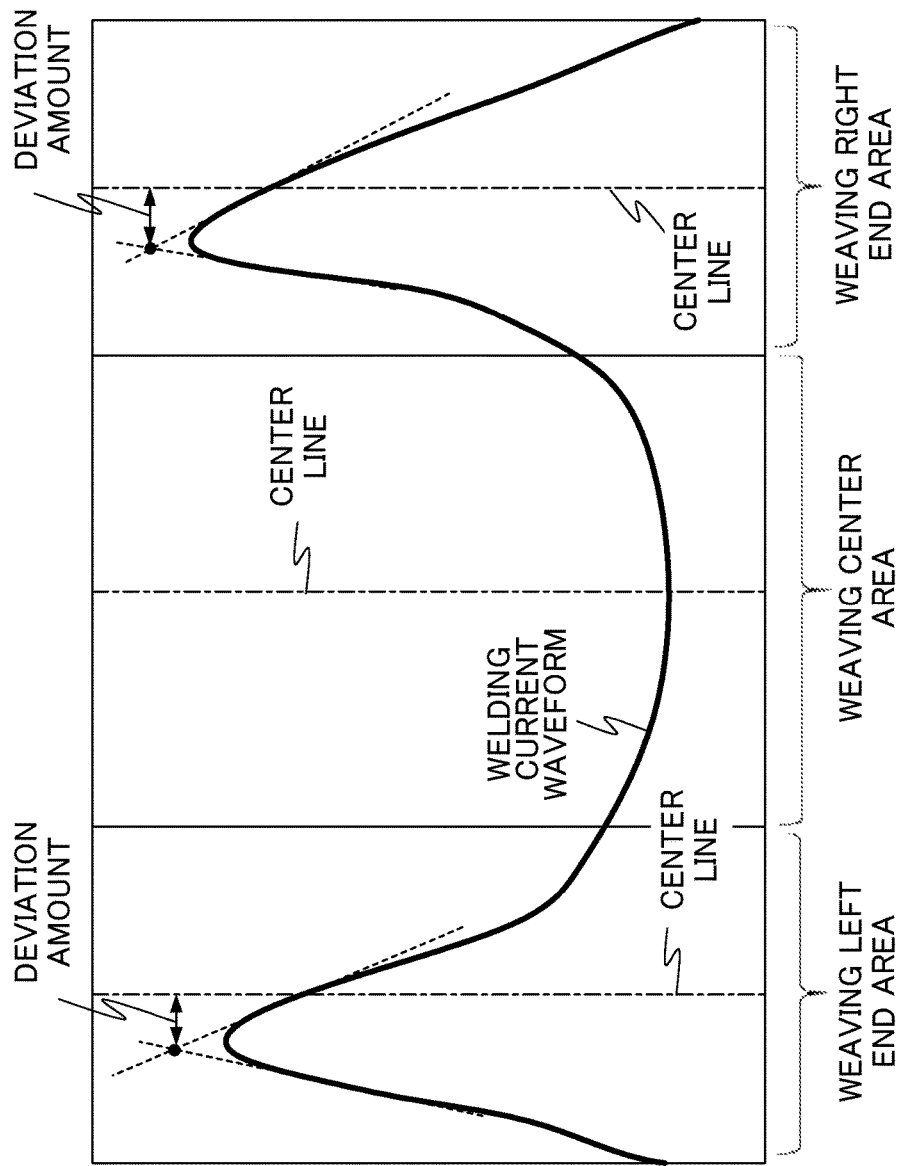
FIG. 11 is an explanatory view about a method of calculating a deviation amount in a welding current waveform by the arc welding robot system according to the embodiment of the present invention.

Alternatively, as shown in FIG. 11, without using a peak of a crest in a welding current waveform, the calculation unit 168 may calculate a delay time adjustment value automatically by determining two regression lines or two regression curves through fitting of a welding current waveform and acquiring the amount of deviation of a moment associated with a point of intersection of the regression lines or the regression curves from a moment associated with a center line in each area forming the sampling current area.

For acquisition of the above-described deviation amount, the calculation unit 168 may determine the amount of deviation of a peak of one crest or a point of intersection associated with one crest from a center line in any area forming the sampling current area. Alternatively, the calculation unit 168 may calculate a delay time adjustment value automatically by determining an average of multiple amounts of deviations of peaks of multiple crests or points of intersection associated with corresponding ones of multiple crests from corresponding areas forming the sampling current area.

After the calculation unit 168 calculates a delay time adjustment value automatically, the current waveform display shift unit 163 shifts a welding current waveform displayed on the display 170 in the temporal axis direction using the calculated delay time adjustment value.

Effect Achieved by Fifth Embodiment

In the fifth embodiment, a delay time adjustment value is calculated automatically. Thus, a user can be released from a burden of inputting a candidate for a delay time adjustment value to the delay time adjustment value entry field repeatedly and shifting a welding current waveform repeatedly. Further, while a delay time adjustment value is calculated automatically, a result reflecting the calculated value can be checked immediately on a graph by the user. Thus, the user is allowed to make a determination easily not to apply an erroneous value calculated automatically.

A control method implemented by the arc welding robot system 100, 200, 300, 400, or 500, and by the robot controller 110 and the teaching operation terminal 150 is realized by software. To realize the control method by software, programs constituting this software are installed on a computer (robot controller 100 or teaching operation terminal 150). These programs may be stored in a removable medium and distributed to a user. Alternatively, these programs may be distributed to the user by being downloaded onto a computer of the user through a network. Still alternatively, these programs may not be downloaded but may be offered to the computer (robot controller 100 or teaching operation terminal 150) of the user as Web service through a network.

In these embodiments, a welding current during arc welding is measured by the welding power supply. Alternatively, the welding current may be measured by an external current measurement unit such as a shunt resistor. A result of the measurement may be transmitted to the arc sensor 130 in the rotor controller 110.

EXPLANATION OF REFERENCE NUMERALS

10 Arc welding robot
50 Welding work
70 Arc welding power supply
100 200 300 400 500 Arc welding robot system
110 Robot controller
120 160 Control unit
121 Welding command unit
122 Operation command unit
130 Arc sensor
140 Welding current storage unit
150 Teaching operation terminal
161 Welding current display unit
162 Sampling current area display unit
163 Current waveform display shift unit
164 Averaged waveform replacement unit
165 Filtered waveform replacement unit
166 Filtering application unit
167 Input information application unit
168 Calculation unit
170 Display

What is claimed is:

1. An arc welding robot system that performs automatic arc welding by detecting a welding current flowing while welding proceeds with weaving of a welding torch and making the welding torch trace a weld line in a welding work as a center of the weaving using an arc sensor,
the arc welding robot system comprising a robot controller and a teaching operation terminal,
the robot controller comprising:
the arc sensor; and
a welding current storage that stores the current value of a welding current detected by the arc sensor during implementation of the arc welding,
the teaching operation terminal comprising:
a display on which data is displayed; and
a processor configured to:
display the current value and the waveform of the welding current in any weaving cycle on the display;
display a sampling current area on the display; and
shift the waveform of the welding current in a temporal axis direction on the display based on a delay time adjustment value.

2. The arc welding robot system according to claim 1, wherein the processor is further configured to replace the waveform of the welding current with a waveform averaged over all weaving cycles.

3. The arc welding robot system according to claim 1, wherein the processor is further configured to replace the waveform of the welding current with a waveform filtered by a filtering method selected by a user.

4. The arc welding robot system according to claim 3, wherein the processor is further configured to apply the filtering method to arc welding to be performed next.

5. The arc welding robot system according to claim 1, wherein the processor is further configured to apply information input to implementation of arc welding.

6. The arc welding robot system according to claim 1, wherein the processor is further configured to:
calculate information to be input based on an amount of deviation between a moment associated with a center in the sampling current area and a moment associated with a peak in the waveform of the welding current, and
shift the waveform of the welding current in the temporal axis direction on the display based on the information.

7. The arc welding robot system according to claim 1, wherein the processor is further configured to:
calculate information to be input based on an amount of deviation between a moment associated with a center in the sampling current area and a moment associated with a point of intersection of two regression lines or two regression curves determined by fitting of the waveform, and
shift the waveform of the welding current in the temporal axis direction on the display based on the information.

8. The arc welding robot system according to claim 6, wherein the deviation amount includes multiple deviation amounts associated with corresponding ones of multiple crests in the waveform, and the processor is further configured to acquire the multiple deviation amounts and calculate the information to be input by using an average of the multiple deviation amounts.

* * * * *